United States Patent [19]
Focke et al.

[11] Patent Number: 5,588,286
[45] Date of Patent: Dec. 31, 1996

[54] FOLDING DEVICE, ESPECIALLY FOLDING TURRET, WITH FOLDING MANDREL

[75] Inventors: Heinz Focke, Verden; Hans-Jürgen Bretthauer, Bremen, both of Germany

[73] Assignee: Focke & Co. (GmbH & Co.), Verden, Germany

[21] Appl. No.: 544,476

[22] Filed: Oct. 18, 1995

[30] Foreign Application Priority Data

Oct. 19, 1994 [DE] Germany ............... 44 37 404.6

[51] Int. Cl.⁶ .................. B65B 11/02; B65B 19/24; B31B 1/28; B23K 26/00
[52] U.S. Cl. .................. 53/575; 53/234; 53/255
[58] Field of Search ............... 53/575, 234, 538, 53/252, 236, 255, 258

[56] References Cited

U.S. PATENT DOCUMENTS

| | | | |
|---|---|---|---|
| 4,044,528 | 8/1977 | Black et al. | 53/575 |
| 4,241,564 | 12/1980 | Quarenghi | 53/575 |
| 4,476,665 | 10/1984 | Oberdorf | 53/575 |
| 4,674,997 | 6/1987 | Nagata et al. | 53/575 X |
| 4,852,335 | 8/1989 | Focke et al. | 53/575 |
| 4,862,680 | 9/1989 | Krah | 53/575 |
| 5,176,605 | 1/1993 | Focke | 53/575 X |

FOREIGN PATENT DOCUMENTS

| | | |
|---|---|---|
| 2851473 | 7/1979 | Germany . |
| 4131192 | 4/1993 | Germany . |

*Primary Examiner*—James F. Coan
*Attorney, Agent, or Firm*—Sughrue, Mion, Zinn, Macpeak & Seas

[57] ABSTRACT

For the production of soft-cup cigarette packs, use is made of folding mandrels (13) which are designed as hollow bodies, on the outside of which pack blanks (12) are folded, and into which a cigarette group (11) is pushed. To produce a precise pack, the folding mandrel (13) preferably consists of two mandrel parts (19, 20) which are connected to one another by thin laser-weld seams (21, 22). The two mandrel parts are made of spring-steel sheets. The folding mandrel (13) so designed is releasably fastened to a folding turret in a special way via a connecting piece.

11 Claims, 6 Drawing Sheets

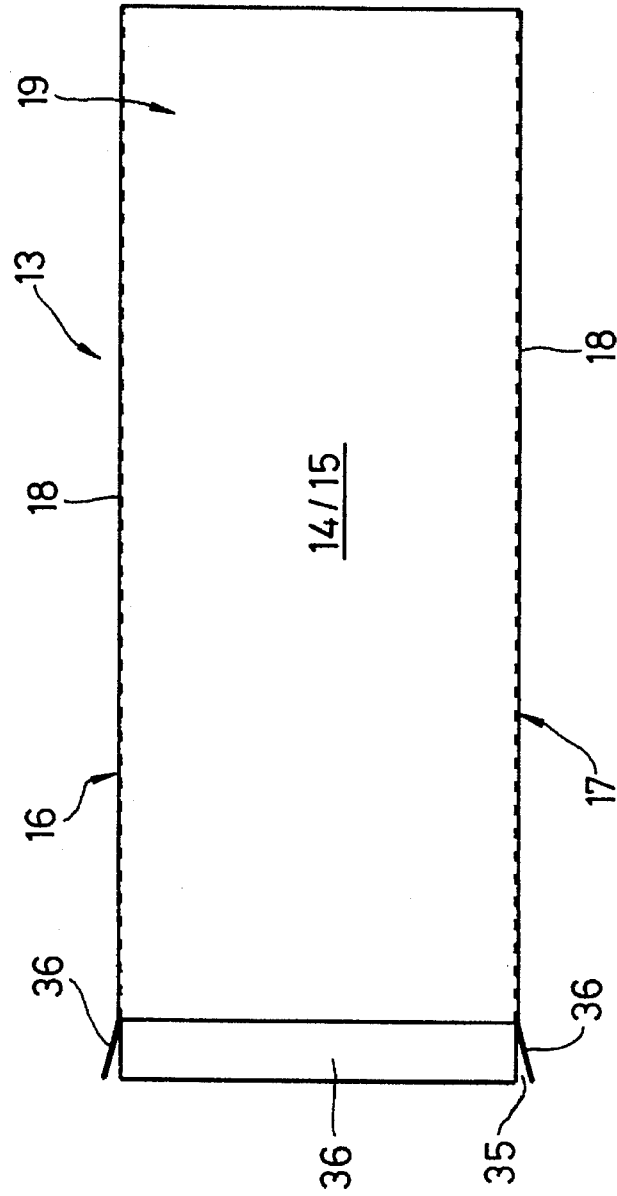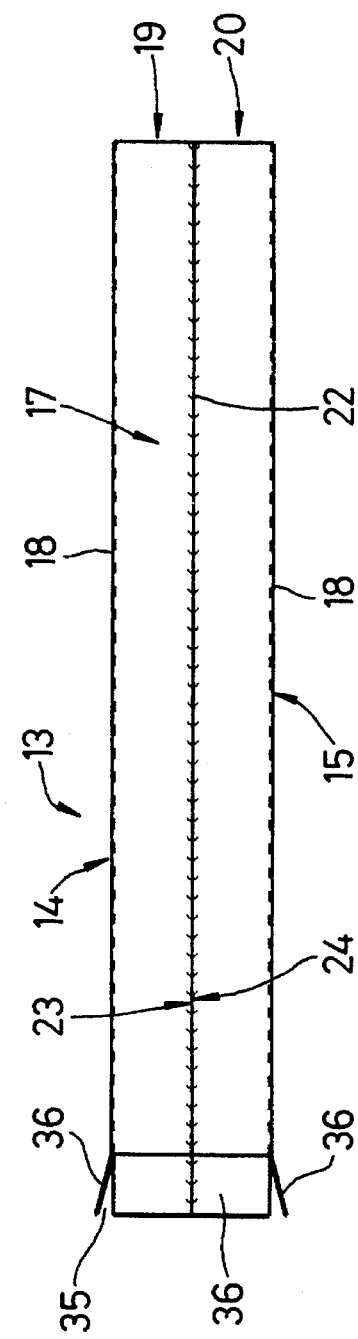
Fig. 3
Fig. 4

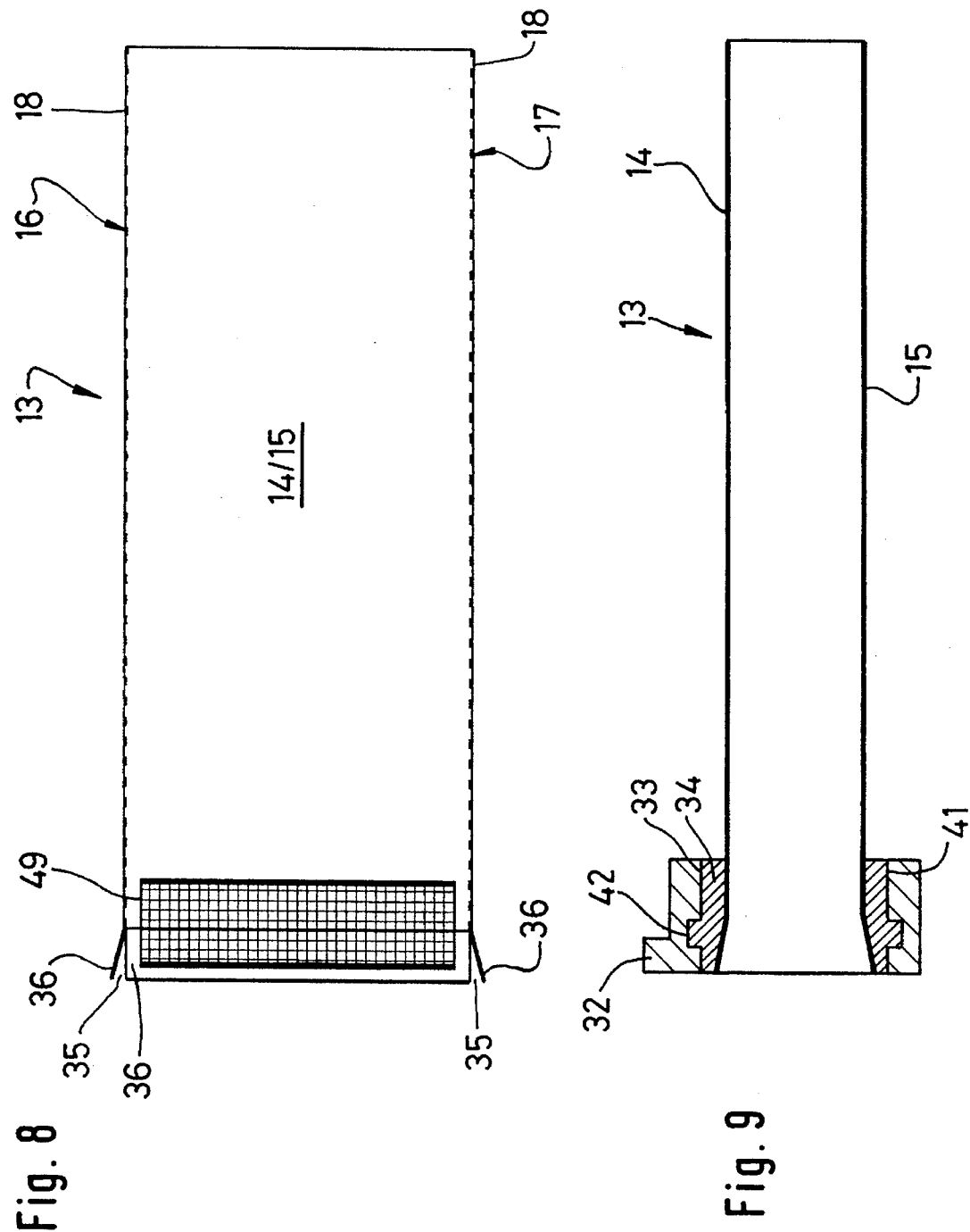

FOLDING DEVICE, ESPECIALLY FOLDING TURRET, WITH FOLDING MANDREL

The invention relates to a folding device, especially a folding turret, with at least one holder for blanks and pack content, especially cigarettes, a so-called folding mandrel, which projects on one side and is open at both ends and Which consists of thin-walled metallic material.

Folding mandrels are elongate hollow bodies which, projecting, that is to say protruding, on one side, are arranged on a folding turret or the like. A multiplicity of folding mandrels of this type are positioned along the circumference of the folding turret and are oriented in an axis-parallel direction. Blanks for the production of packs are fed to the outside of the folding mandrels and are folded on these. The pack content, especially a group of cigarettes, after a substantial folding of the blanks, is pushed into the folding mandrel. The unit Consisting of the folded blanks and of the cigarette group is then jointly drawn off from the folding mandrel or pushed out of this. Folding mandrels are used predominantly in the production of soft-cup cigarette packs.

The above-described function of the folding mandrels makes it necessary for these to be produced from extremely thin-walled material. Furthermore, the folding mandrels are to be shaped exactly and be dimensionally stable.

SUMMARY OF THE INVENTION

The object on which the invention is based is to improve the production of folding mandrels and their design, in such a way that they can be produced with high accuracy from very thin-walled metallic material.

To achieve this object, the folding device according to the invention is characterized or the folding mandrels mounted on this are characterized in that they consist of at least One shaped material blank with at least one longitudinal seam which is made by laser welding.

By means of the laser-welding technique known in other technical fields, it is possible, in the case of very thin-walled metallic material, to make a likewise extremely thin or fine weld seam which avoids local thickenings of material.

Preferably, a folding mandrel designed according to the invention consists of two mandrel parts which are designed with a U-shaped cross-section and which are connected to one another in the region of mandrel walls located opposite one another, especially in the region of narrow side walls, in each case by means of a laser-weld seam. The mandrel halves of U-shaped cross-section are advantageous in production terms.

Advantageously, mutually confronting (longitudinal) edges of the mandrel parts are butt-connected to one another by laser welding in the region of a longitudinal mid-plane of the folding mandrel. The weld seam is made by using the laser technique, in such a way that those faces of the longitudinal edges to be connected to one another are brought into a mouldable state and are connected to one another during this state.

Alternatively, the laser-weld seam or laser-weld seams can also be formed in the region of a material overlap, namely in the region of bent strip-shaped edges of the mandrel parts.

The folding mandrel or the mandrel parts preferably consist of spring steel.

The invention is concerned, furthermore, with an expedient connection of folding mandrels to the folding turret or another holder.

BRIEF DESCRIPTION OF THE DRAWINGS

An exemplary embodiment of the invention, namely a folding mandrel with anchoring on a folding turret, is explained in more detail below by means of the drawings. In these:

FIG. 3 shows a top view of a folding mandrel as a detail, FIG. 4 shows a side view of the folding mandrel according to FIG. 3, FIG. 8 shows a further embodiment of a folding mandrel in a top view similar to that of FIG. 3, FIG. 9 shows a detail of the anchoring of the folding mandrel in a mounting, as an alternative to FIG. 5.

DESCRIPTION OF PREFERRED EMBODIMENTS

Figure 1:
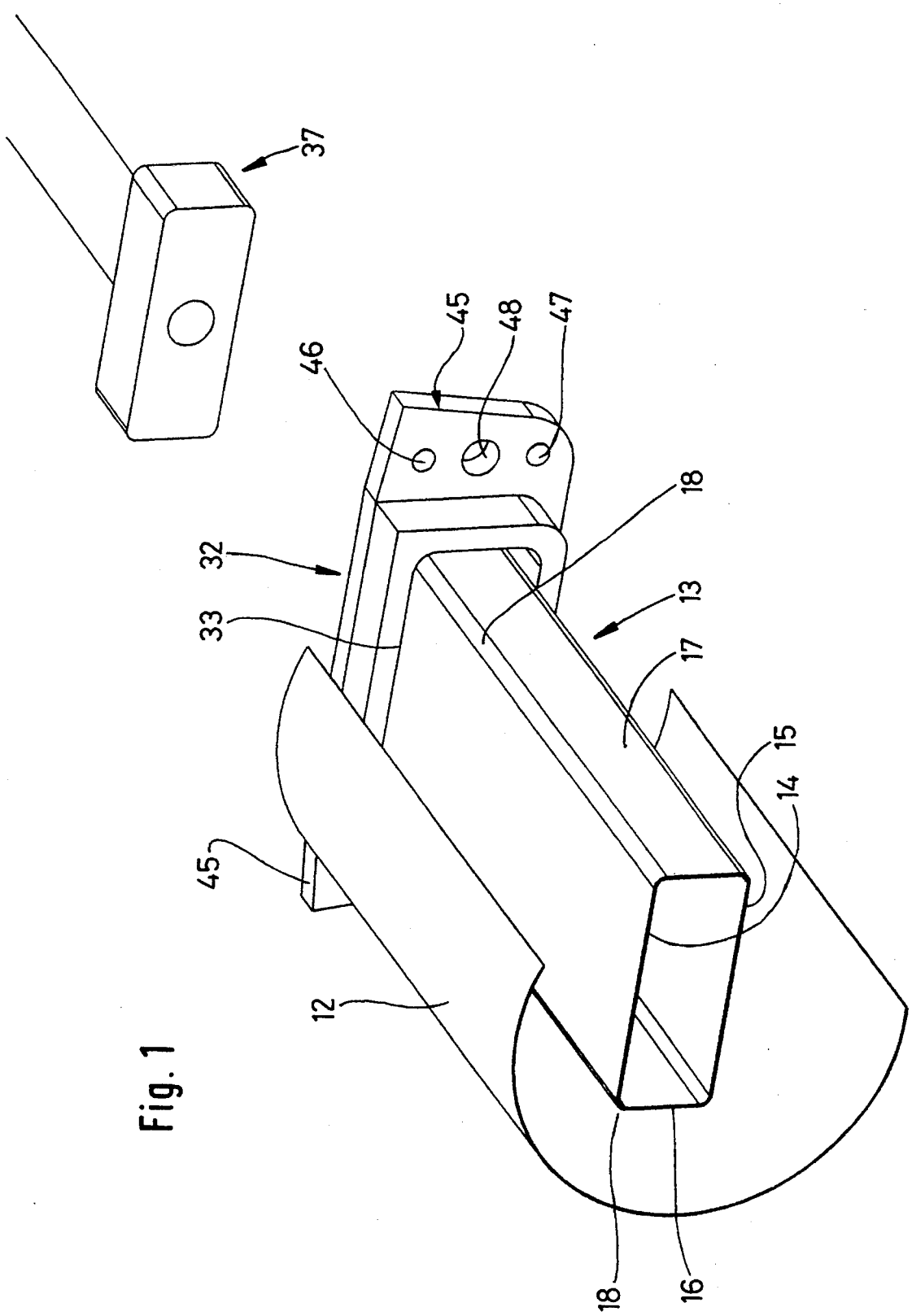
FIG. 1 shows a folding mandrel as a detail of a folding device in a perspective representation.

The exemplary embodiments shown relate to the production of cigarette packs, each for a group of cigarettes 10, that is to say for a cigarette group 11. The pack, not shown in detail, is preferably a soft-cup pack consisting of a plurality of blanks 12 of packaging material, especially paper and tinfoil. The blanks 12 are folded on a shaping body, namely on a folding mandrel 13, the outer contour and outer dimensions of which correspond to the inner dimensions of the pack. The blanks 12 are laid successively onto the folding mandrel 13 and folded on this, in such a way that a cup open on one side is obtained. An example of a packaging apparatus equipped with folding mandrels 13 of this type is described in U.S. Pat. No. 4,852,335.

The folding mandrel 13 is designed as an elongate hollow body and is open at both ends. The folding mandrel 13 has an approximately rectangular cross-section, limited by an upper wall 14, a correspondingly designed lower wall 15 and elongate side walls 16, 17 connecting these to one another. Longitudinal edges 18 are rounded, for example with a radius of 2 mm.

The folding mandrel 13 preferably consists of a high-alloy rust-resistant spring-steel sheet. This material allows an extremely small wall thickness of preferably 0.3 mm.

In the present exemplary embodiments, the folding mandrel 13 consists of two parts, namely of two mandrel parts 19 and 20 of U-shaped cross-section. In the present case, these are of equal size and, furthermore, are designed in the same way. In the region of an (imaginary) transverse mid-plane, the mandrel parts 19, 20 are connected to one another, specifically, in each case, by means of a laser-weld seam 21, 22. This extends preferably over the entire length of the folding mandrel 13.

Figure 2:
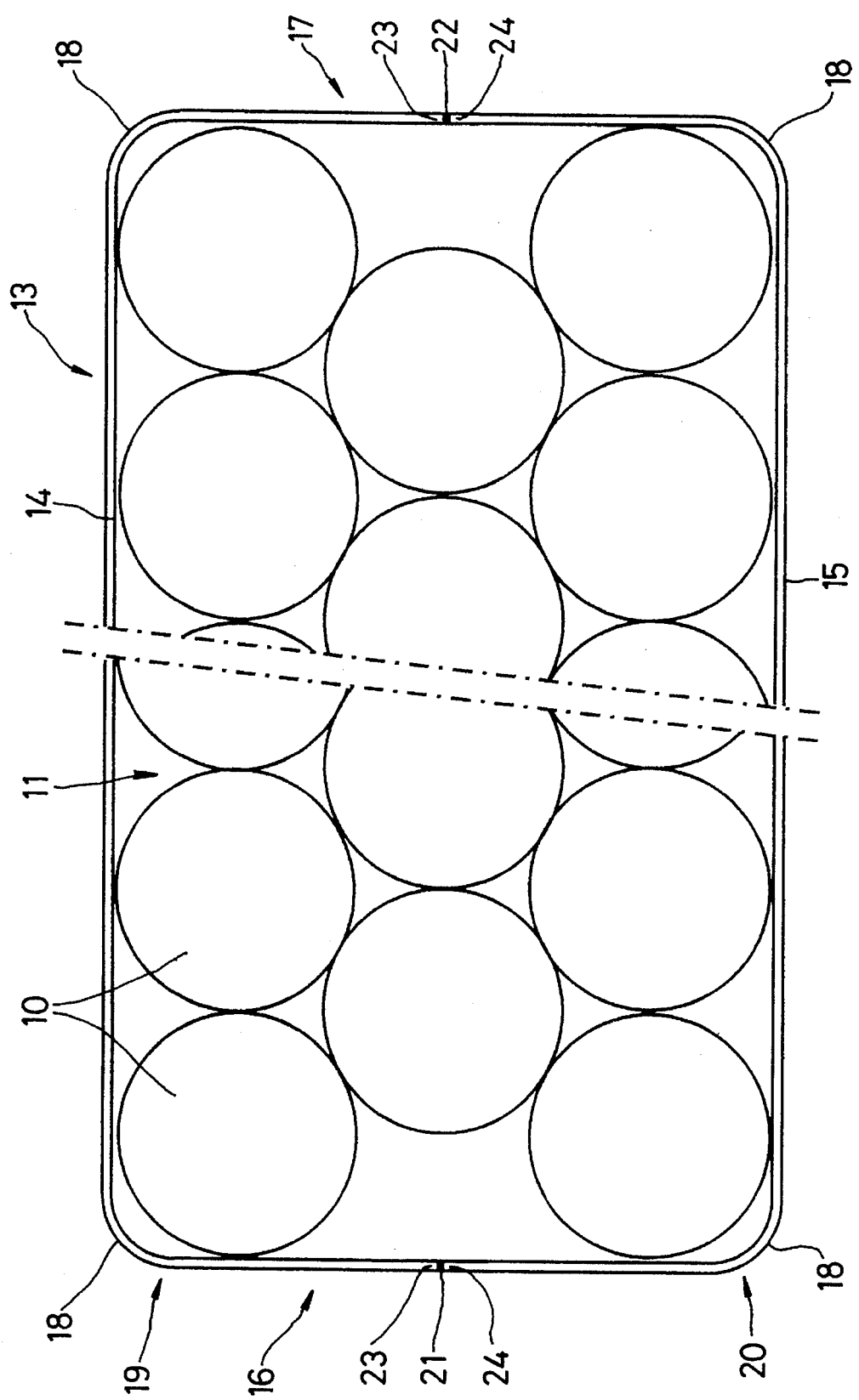
FIG. 2 shows a folding mandrel with a cigarette group in cross-section on a greatly enlarged scale.

In the preferred exemplary embodiment according to FIG. 2, the mandrel parts 19 and 20 are "butt"-connected to one another by laser welding. The laser-weld seams 21, 22 in this case extend directly in the cross-sectional region of the walls of the mandrel parts 19, 20. When the welding method is employed, the procedure is such that, in the region of abutting edges 23, 24 are connected to one another, free edge faces are plasticized or rendered flowable by laser action and are directly connected to one another. The side walls 16, 17 are smooth-faced on the inside and outside in the region of the laser-weld seams 21, 22.

Figure 7:
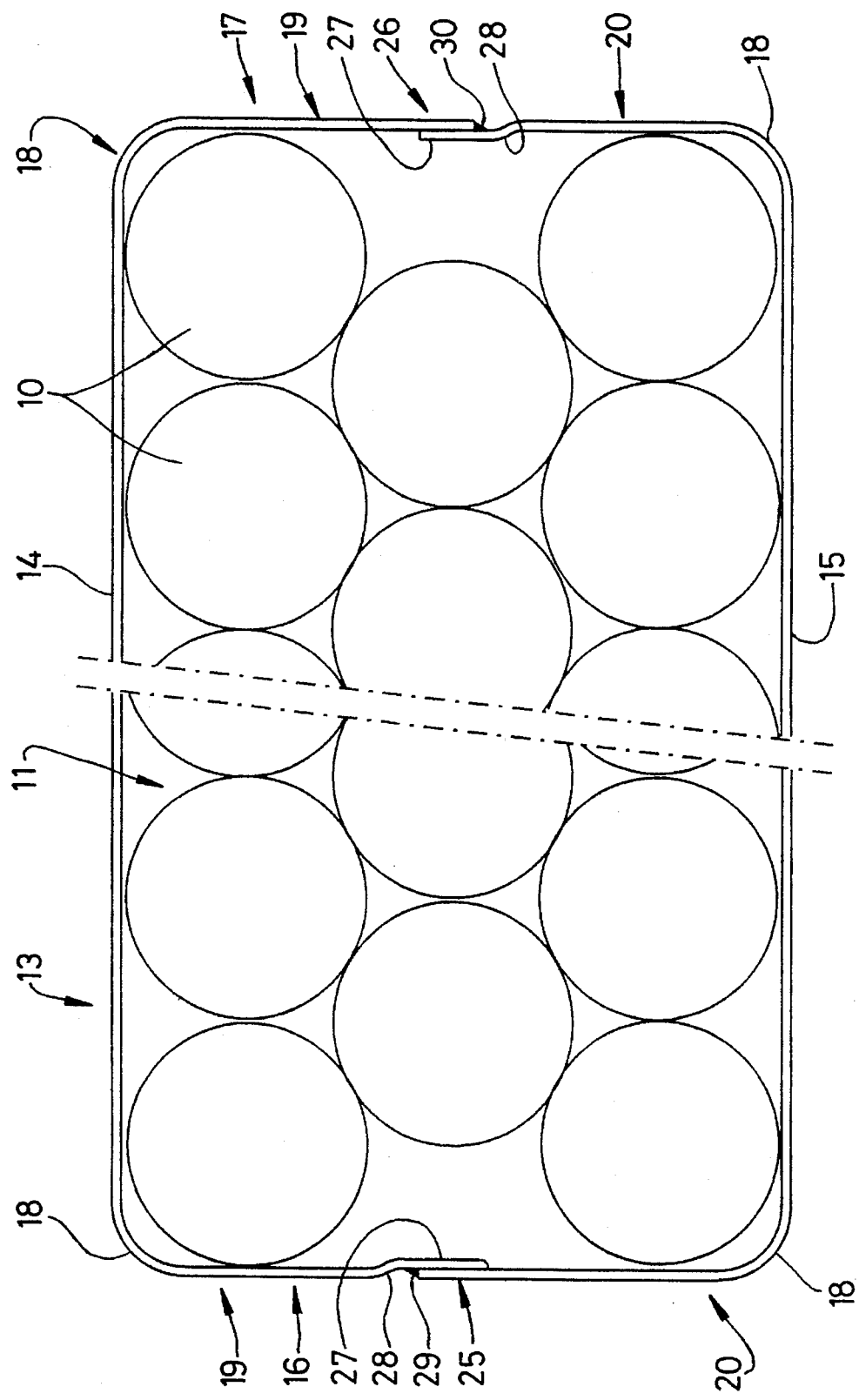
FIG. 7 shows a representation, similar to that of FIG. 2, of another embodiment of the folding mandrel.

FIG. 7 shows an alternative in respect of the design of the mandrel parts 19 and 20 and of the connection of these which is made by laser welding. Here, the said walls 16 and 17 are designed in such a way that they form an overlap 25, 26. An inner leg 27 of the overlap 25, 26 is designed with an inward-directed bend 28. This results, on the outside of the side walls 16, 17, in a groove-like depression. In the region of this, a weld seam is made, namely a laser-weld seam 29, 30. As in the exemplary embodiment of FIG. 2, this too is made without additional welding material, solely as a result of the fusion process in the region of the faces and walls to be connected to one another.

Also in the exemplary embodiment according to FIG. 7, the two mandrel parts 19 and 20 of the folding mandrel 13 are designed identically. Identical parts are therefore always connected to one another in a corresponding relative position of the overlaps 25, 26. In the exemplary embodiment of FIG. 2, the laser-weld seams 21, 22 extend in a horizontal mid-plane of the folding mandrel 13.

The folding mandrels 13 are mounted or anchored at one end only, in the present exemplary embodiment on or in a carrier disc 31 of a folding turret. The latter can be designed in the way described in U.S. Pat. No. 4,852,335.

Figure 6:
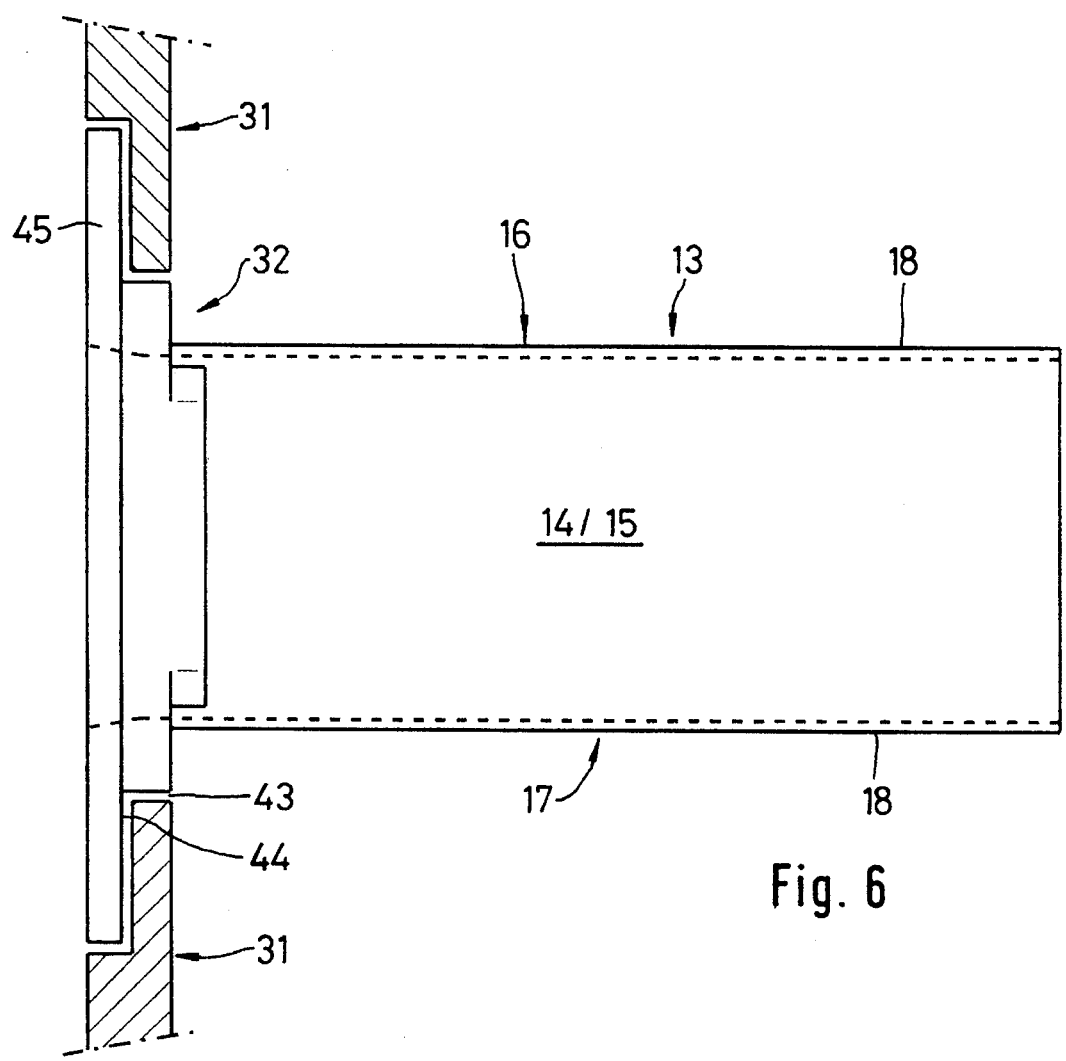
FIG. 6 shows details of an anchoring of a folding mandrel in horizontal section.

The folding mandrels 13 are each anchored firmly at one end in a holding member. This is a connecting piece 32 which completely surrounds the folding mandrel 13 at its end and which terminates flush with its end (FIG. 6). The connecting piece 32 is itself designed in such a way that it can be connected effectively to the folding turret or the carrier disc 31.

The end of the folding mandrel 13 is seated in an orifice 33 of the connecting piece 32. The dimensions of the orifice 33 are larger than the outer dimensions of the folding mandrel 13, at least in the region of the upper wall 14 and lower wall 15. An originally mouldable and hardenable anchoring compound 34 is introduced in an interspace thus formed which is open on both sides. This anchoring compound 34 can be moulded or is liquid while the connection is being made. After a hardening process, the anchoring compound 34 is solidified, so that the folding mandrel 13 is anchored permanently in the connecting piece 32.

The anchoring compound 34 is preferably a two-component metal adhesive, especially with an aluminium component. The two-component metal adhesive is known in principle.

That end of the folding mandrel 13 facing the folding turret or the carrier disc 31 serves for introducing the pack content, namely the cigarette group 11, into the folding mandrel 13. This end is of funnel-shaped design. For this purpose, the upper wall 14, lower wall 15 and side walls 16 and 17 are separated from one another in the region of the longitudinal edges 18 by severing cuts 35 and are in each case shaped outwards, so that obliquely directed wings 36 are obtained in the region of folding-mandrel ! walls. The folding mandrel 13 is positioned in the anchoring compound 34 by means of these wings 36 diverging towards the end. The anchoring compound 34 thus stabilizes the funnel shape of the folding mandrel 13 at the push-in end. The cigarette group 11 is first pushed into the folding mandrel 13 by a ram 37 movable in the longitudinal direction of the folding mandrel 13 and is thereafter pushed out on the opposite side, at the same time taking up the partially folded pack.

Figure 5:
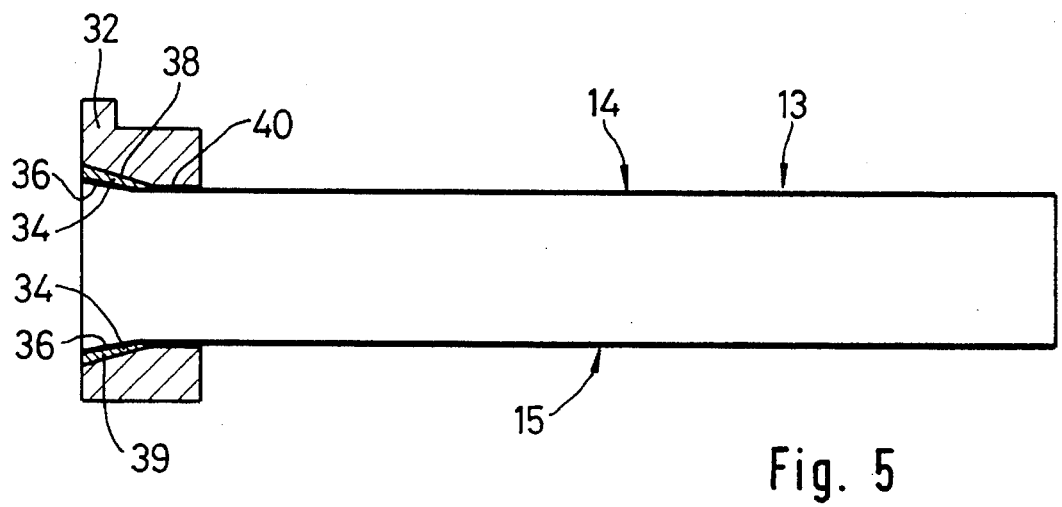
FIG. 5 shows a folding mandrel with one-sided mounting in longitudinal section.

The folding mandrel 13 can be anchored at the funnel-shaped end in the connecting piece 32, namely in the orifice 33, in various ways. In the preferred exemplary embodiment according to FIG. 5, the cross-section of the orifice 33 is designed differently. On the free introduction side of the folding mandrel 13, the orifice 33 is limited by funnel-shaped faces 38. These faces 38 have a larger angle than the obliquely directed wings 36 of the folding mandrel 13. This results in a gap-like cavity 39 between the wings 36 and the limitation of the orifice 33. The cavity 39 is designed with a transverse dimension or width decreasing in the longitudinal direction of the folding mandrel 13, that is to say with a wedge-shaped cross-section, in such a way that a portion 40 of the connecting piece 32 bears directly on the wall of the folding mandrel 13. The cavity 39 is filled with the anchoring compound 34.

In the exemplary embodiment according to FIG. 9, a cavity 41 formed by the orifice 33 and the folding mandrel 13 extends over the entire transverse dimension of the connecting piece 32. On the outside, a groove or depression 42 filled with anchoring compound 34 is formed in the wall of the connecting piece 32.

For a better anchoring of the folding mandrel 13 in the connecting piece 32, holding means are fastened to the folding mandrel 13 on the outside in the exemplary embodiment according to FIG. 8. These are, in the present case, holding strips 49 consisting of a wire cloth, especially made from special steel. The holding strips 49 are fastened to the walls of the folding mandrel 13 by laser welding, specifically, here, in the region of the wings 36. The anchoring compound 34 penetrates into the orifices or depressions of the holding strips 49 for the purpose of improving the adhesion.

The folding mandrel 13 and connecting piece 32 are connected as a unit to the folding turret. The carrier disc 31 of the latter is provided in the region of the folding mandrels 13 with perforations 43 or orifices, into each of which a folding mandrel 13 or a connecting piece 32 can be inserted positively and with a fit. The perforation 43 is made step-shaped in cross-section, at least in the region of two sides located opposite one another. This results in each case in an offset 44. A flange 45 of the connecting piece 32, the said flanges extending on both sides, penetrates into the offset 44 with a fit.

The two laterally directed flanges 45 located opposite one another are provided with bores for fastening means. These are upper and lower bores 46, 47 for the passage of fastening screws. Located between these bores 46, 47 is a centering bore 48 for the passage of a centering pin (not shown). This is attached to the carrier disc 31 in an exact position, specifically to the offset 44. The centering pin brings about the exact positioning of the folding mandrel 13 in the centering bore 48. Connecting bolts or connecting screws penetrating into the bores 46 and 47 ensure fastening to the folding turret.

What is claimed is:

1. A folding device, for pack blanks (12) and pack contents (10), comprising a folding mandrel (13) which is positioned so as to project from one side of the folding device, which is open at two opposite ends thereof, and which is made of thin-walled metallic material, wherein the folding mandrel (13) comprises at least one sheet of said material, said sheet having at least one longitudinal laser-weld seam (21, 22; 29, 30).

2. The folding device as claimed in claim 1, wherein the folding mandrel (13) comprises another sheet of said material, said one sheet and said another sheet forming two identical mandrel parts (19, 20), each of which has a U-shaped cross section, and which are connected to one another, by said laser-weld seam and another laser-weld seam, (21, 22; 29, 30), in two narrow opposite side walls (16, 17), respectively, of the mandrel.

3. The folding device as claimed in claim 2, wherein the mandrel parts (19, 20) bear on one another with abutting edges (23, 24) extending in the longitudinal direction, in the side walls (16, 17), and are butt-connected to one another by said first and said another laser-weld seams (21, 22) without any welding material.

4. The folding device as claimed in claim 2, wherein, at said one and said another weld seams (29, 30), respective portions (27) of the two side walls (16, 17) are inwardly deformed to form bends (28), in such a way that overlaps (25, 26) of the walls (16, 17) are formed and lie in a common plane on the outside of the folding mandrel, the weld seams (29, 30) extending in respective grooves formed by the bends (28).

5. The folding device as claimed in claim 2, wherein each sheet is made of spring steel and has a wall thickness of 0.3 mm.

6. A folding device, for pack blanks (12) and pack contents, comprising a folding mandrel (13) which is positioned so as to project from one side of the folding device, which is open at two opposite ends thereof, and which is made from thin-walled metallic material, wherein one of said ends of the folding mandrel faces a carrier disk (31) of the device, and is anchored in a region of the carrier disk (31) by an originally moldable hardenable anchoring compound (34) in the form of a two-component metal adhesive.

7. The folding device as claimed in claim 6, wherein the folding mandrel, in the anchoring region on the carrier disk (31), is provided on art outside thereof, at least in regions of art upper wall (14) and a lower wall (15) of the mandrel, with projections and depressions for positive connection to the anchoring compound (54), and with mesh-like holding strips (49) which are fastened to the folding mandrel (13) by laser welding.

8. The folding device as claimed in claim 6, wherein said one end of the folding mandrel (13) is fastened by a connecting piece (32) to the carrier disk (31), said one end of the folding mandrel (13) being fixed in an orifice (33) of the connecting piece (32) by the anchoring compound (34).

9. The folding device as claimed in claim 8, wherein the orifice (33) in the connecting piece (32) is for receiving a funnel-shaped end of the folding mandrel (13), and is likewise funnel-shaped, in such a way that limiting faces of the orifice (33) are directed at an angle to the folding mandrel (13), and the anchoring compound (34) is in a gap-like cavity (39) thus formed and has a wedge-shaped cross-section.

10. The folding device as claimed in claim 8, wherein the connecting piece (32) is fastened with a fit in a perforation (43) of the carrier disk (31), by flanges (45) which have bores (46, 47), for connecting bolts or screws, and a centering bore (48) for a centering pin.

11. A folding device, for pack blanks (12) and pack contents in the form of cigarettes, comprising a folding mandrel which is positioned so as to project from one side of the folding device, which is open at two opposite ends thereof, and which is made of thin-walled metallic material, wherein one of said ends of the folding mandrel (13) faces a carrier disk (31) of the folding device, and is widened in a funnel-shaped manner to form an opening for a group (11) of the cigarettes, and wherein the folding mandrel has a top wall (14), a bottom wall (15) and two side walls (16, 17), which are separated from one another at said opening, along longitudinal edges (38) of the folding mandrel, by severing cuts (35), such that the upper wall (14), the lower wall (15), and the two side walls (16, 17) are provided with obliquely directed wings (36) which are separated from one another.

* * * * *